A. M. PUTNAM.
Pump.
No. 6,537. Reissued July 6, 1875.
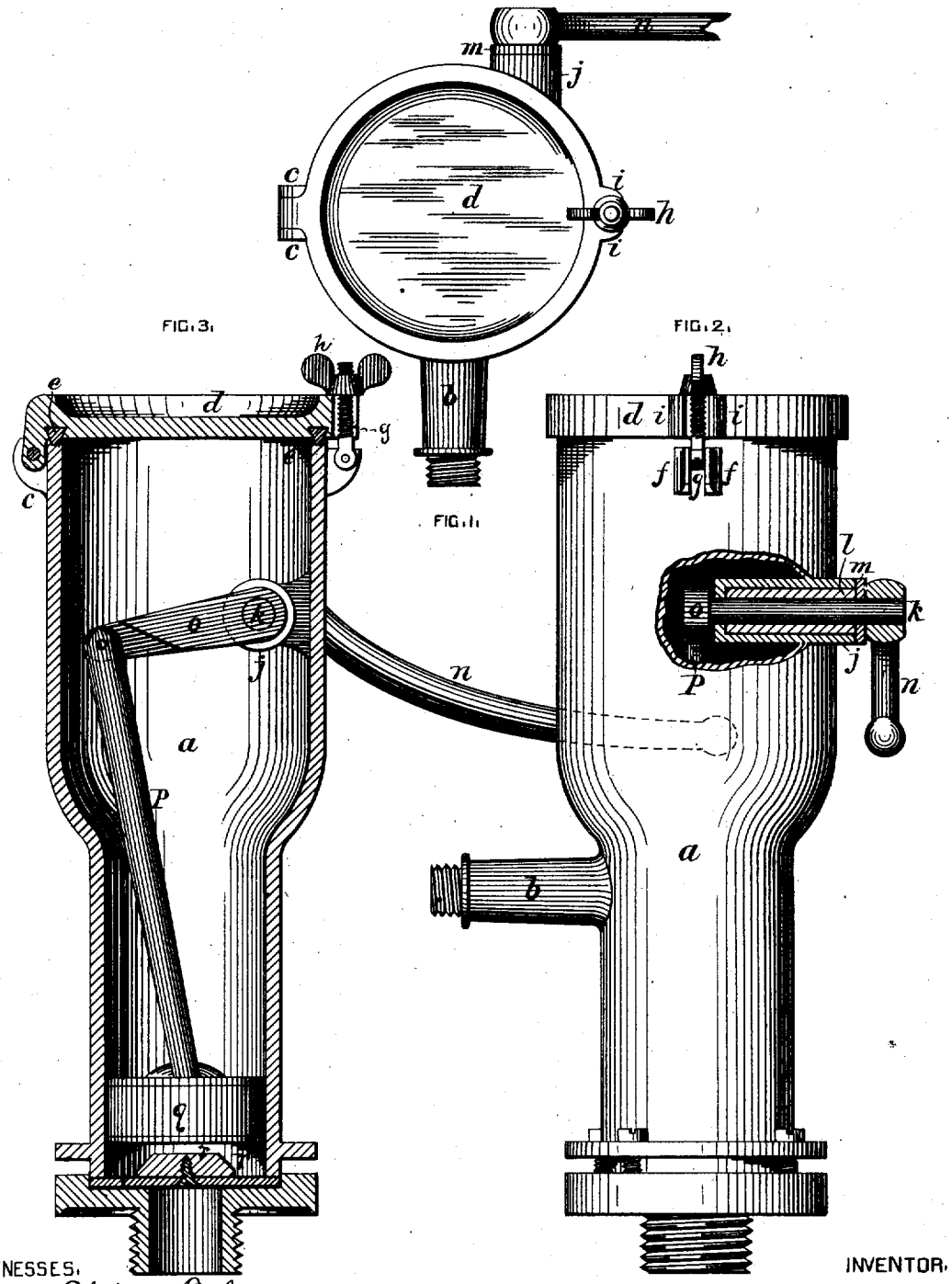
WITNESSES.
Philip F. Larner
A. B. Cauldwell
INVENTOR.
Albert M. Putnam,
By Mr. C. Mord
Associate Attorney
N. PETERS, PHOTO-LITHOGRAPHER, WASHINGTON, D. C.

UNITED STATES PATENT OFFICE.

ALBERT M. PUTNAM, OF ANTRIM, ASSIGNOR, BY MESNE ASSIGNMENTS, TO HIMSELF AND CHARLES H. CARTER, OF SAME PLACE, AND GRANVILLE P. FELT, OF PETERBOROUGH, NEW HAMPSHIRE.

IMPROVEMENT IN PUMPS.

Specification forming part of Letters Patent No. 94,338, dated August 31, 1869; reissue No. 6,537, dated July 6, 1875; application filed January 22, 1875.

*To all whom it may concern:*

Be it known that I, ALBERT M. PUTNAM, of Antrim, in the county of Hillsborough and State of New Hampshire, have invented certain new and useful Improvements in Pumps; and I do hereby declare that the following specification, taken in connection with the drawings, is a full, clear, and exact description thereof.

My invention consists in extending the barrel of the pump vertically upward above the discharge-nozzle, so that such extension shall, when its head is closed, form an air-chamber. And, also, in combining with the pump-barrel and air-chamber a rocking shaft, arranged transversely to the longitudinal axis of the pump-barrel, mounted in a packed journal-bearing, the interior of which communicates with the interior of the pump-barrel and is located between the discharge-nozzle and the top of the air-chamber. Said rocking shaft has a hand brake or lever attached to its end, which projects on the outside of the barrel beyond the journal-bearing, and a lever-arm, also attached to said shaft, is located within the interior of the pump-barrel and is connected with the pump-piston. I also make the cover of the air-chamber removable, and so attach it to the top of the chamber that the joint will be air-tight, whereby the pump can be converted at pleasure from a common house or lifting pump into a force-pump.

Referring to the drawings, Figure 1 represents a plan of a pump with my improvements attached. Fig. 2 represents a side elevation of the same, with parts broken out, showing its construction and operation. Fig. 3 represents a vertical section of Fig. 1, showing the operation of the different devices.

Similar letters in the different figures indicate corresponding parts.

In the construction of my pump the barrel *a*, and the extension to form the air-chamber, are cast, preferably of iron, and in one piece. Above the discharge nozzle *b*, the barrel is extended upward and enlarged in diameter, to form an air-chamber, as shown. The top of the extension of the barrel is provided with ears *c c*, to which is hinged the cover or cap *d*, the under side of which is finished off true, and is provided with a suitable annular recess, which is supplied with elastic packing *e*, as shown at Fig. 3 of the drawings. Near the top of the extension of the barrel, and on the opposite side from the hinge of the cover, are ears *f f*, cast on the barrel, to which is pivoted the screw *g*, which is furnished with a thumb-nut, *h*, and by means of which the cover can be securely fastened at pleasure, and the pressure of the same upon the elastic packing *e*, forming an air-tight joint. A close air-chamber is thereby provided, which enables the pump to be used as a force-pump. By slackening the thumb-screw, air will be admitted to the top of the barrel and the apparatus is converted into an ordinary lifting-pump. Between the top of the air-chamber and the spout or nozzle *b* is cast, with the barrel, and as a part of the same, a journal-bearing, *j*, in which the transverse rocking shaft *k* is mounted. This bearing is enlarged for a portion of its length so as to allow of the insertion of packing *l*, and the outer end is closed by a collar, *m*. The rocking-shaft extends beyond the collar sufficiently to allow a brake or handle, *u*, to be attached thereto. Secured to the shaft *k*, in the inside of the air-chamber, is the arm *a*, which is connected with the pump bucket or piston by means of the usual link-rod P. Attached to the bottom of the piston or bucket *q* is a common valve, opening upward, and underneath the same is located the common foot-valve *r*.

By reason of the simplicity of its construction, this pump can be manufactured and possess all the capacities of a house and a force pump, at a very low cost.

What I claim as my invention, and desire to secure by Letters Patent, is—

1. The combination, with a pump-barrel, having a close air-chamber above the delivery-nozzle, formed by a vertically upward extension of the barrel, of a transverse rocking-shaft, *k*, mounted in a packed journal-bearing, formed on the side of and communicating with the interior of the air-chamber, the said rocking-shaft being connected within the barrel to the piston-rod, and on the outside thereof to the operating-brake, substantially as described.

2. The combination, in a pump, of a barrel, which has an upward extension, and a transverse rocking-shaft for operating the pump-piston, mounted in a packed journal-box, as described, with an adjustable cap or cover, *d*, whereby a close air-chamber can be formed, and the pump be converted at pleasure from a simple lifting-pump to a force-pump, substantially as specified.

ALBERT M. PUTNAM.

Witnesses:
P. E. TESCHEMACHER,
N. W. STEARNS.